United States Patent [19]
Niva et al.

[11] Patent Number: 5,410,733
[45] Date of Patent: Apr. 25, 1995

[54] RECEIVED SIGNAL STRENGTH INFORMATION MEASUREMENT USEFUL IN A MOBILE TELEPHONE SYSTEM HAVING MOBILE ASSISTED HANDOFF CAPABILITY

[75] Inventors: Ilkka Niva; Mika Tuutijarvi, both of Oulu, Finland

[73] Assignee: Nokia Mobile Phones Ltd., Salo, Finland

[21] Appl. No.: 16,605

[22] Filed: Feb. 11, 1993

[51] Int. Cl.[6] ............................................... H04Q 7/34
[52] U.S. Cl. .................... 455/33.2; 455/56.1; 455/67.1; 455/311; 455/226.2
[58] Field of Search ........................ 455/33.2, 67.1, 63, 455/54.1, 56.1, 303, 309, 312, 54.1, 311, 226.2

[56] References Cited
U.S. PATENT DOCUMENTS

| | | | |
|---|---|---|---|
| 4,872,204 | 10/1989 | Hammer et al. | 455/54 |
| 5,003,621 | 3/1991 | Gailus | 455/324 |
| 5,142,695 | 8/1992 | Roberts et al. | 455/89 |
| 5,260,943 | 11/1993 | Comroe et al. | 455/33.2 |

FOREIGN PATENT DOCUMENTS 1562963  3/1980  United Kingdom .

OTHER PUBLICATIONS

EIA/TIA Interim Standard, "Cellular System Dual--Mode Mobile Station-Base Station Compatibility Standard", IS-54-B, Apr. 1992, pp. 102-106.

Primary Examiner—Edward F. Urban
Assistant Examiner—Mary M. Lin
Attorney, Agent, or Firm—Perman & Green

[57] ABSTRACT

A method, and apparatus for accomplishing the method, that causes the power of a narrow bandwidth signal to be spread to a wider bandwidth. The method operates by modulating the power of the spectral components that are located close to a carrier frequency. This reduces the DC component of a base band signal and correspondingly reduces the charging of a AC coupling capacitors in the base band circuitry. As a result, receiver recovery time is increased, and a more accurate signal strength estimate is made by a mobile telephone. In one embodiment of the invention a local oscillator signal (LO1) for an IF stage is first offset from a nominal frequency for an RF channel to be measured, and is then subsequently made equal to the nominal frequency. The variation in LO1 introduces phase noise which results in the modulation of the base band signal.

30 Claims, 5 Drawing Sheets

RECEIVED SIGNAL STRENGTH INFORMATION MEASUREMENT USEFUL IN A MOBILE TELEPHONE SYSTEM HAVING MOBILE ASSISTED HANDOFF CAPABILITY

FIELD OF THE INVENTION

This invention relates generally to AC-coupled radio receivers and, in particular, the invention relates to mobile telephones.

BACKGROUND OF THE INVENTION

A Mobile Assisted Handoff (MAHO) function is presently specified for use in the Dual Mode (analog and digital) cellular mobile telephone system. Specifically, the EIA/TIA Interim Standard entitled "Cellular System Dual-Mode Mobile Station-Base Station Compatibility Standard" IS-54-B (April 1992) specifies the MAHO function in Section 2.4.5. Briefly, the MAHO function requires a mobile station to furnish RF channel signal-quality information to a fixed site base station that serves the mobile station. There are two types of channels upon which the mobile station performs signal measurements: (a) a currently assigned forward digital traffic channel, and (b) any other specified forward RF channel(s). The digital traffic channel has a Time Division Multiple Access (TDMA) format having six time slots that occur within a 40 millisecond frame.

Reference is made to FIG. 1 wherein a first base station (BS1) has an associated RF coverage area that overlaps the RF coverage areas of base stations 2 and 3 (BS2 and BS3). Each base station transmits with a unique, predetermined channel frequency. The channel frequencies are spaced apart from one another by 30 kHz. In FIG. 1 a mobile station (MS) is assumed to be served by BS1. When the MAHO function is activated by the receipt of a command from BS1, the MS first measures the received signal strength (RSSI) and estimates the Bit Error Rate (BER) of the current forward digital traffic channel. The MS subsequently reports the estimated BER to the serving BS1 with a Channel Quality Message.

The MS also measures the RSSI of one entry of a received Measurement Order Channel List during an idle time slot at 20 millisecond ($\frac{1}{2}$ frame) intervals. By example, if the RF channels associated with BS2 and BS3 are included within the Measurement Order Channel List, the MS will retune its receiver during an idle time slot to the frequency of BS2, measure the RSSI, and then retune its receiver during another idle time slot to the frequency of BS3 and make another RSSI measurement. The resulting RSSI estimates are reported to the serving BS1 in increments of 2 dBm within a range of −113 dBm, or less, to −51 dBm or greater. The various measurements and estimates made by the MS are employed to determine a next base station to which the MS will be assigned during a handoff procedure.

However, a problem arises during the use of a conventional AC-coupled RF receiver. In the conventional receiver down conversion circuitry produces a base band signal which is sampled with an Analog to Digital (A/D) converter. The resultant base band signal has been found to contain a large amount of DC-power and other low frequency power spectrum components. Also, different base band units (filters and amplifiers) are AC-coupled together, with each unit typically being biased to a particular, different voltage reference.

When making a MAHO RSSI measurement, the receiver is required to tune from the assigned forward digital traffic channel to another forward RF channel, make the signal strength measurement, and then tune back to the assigned forward digital traffic channel, all with a period equal to one half of a frame (20 milliseconds). However, when switching between RF channels to make the MAHO RSSI measurements, a large DC-power in the base band signal will charge the AC capacitors located in the signal path, resulting in a shift in the internal voltage reference levels. The internal voltage reference levels will return to a nominal condition in accordance with an internal time constant. Unfortunately, the time constant is typically of a large enough duration that the original biasing levels will not be restored before the mobile telephone is required to receive in a next assigned time slot. As a result, and as is shown in FIG. 4, the receiver will operate incorrectly due to the presence of a "triangularly" shaped DC-component.

When performing the MAHO function the receiver should ideally be capable of measuring the power of the pure carrier (without any modulation). However, the conventional receiver described above will be blocked due to the large DC base band component. This may increase the BER and result in the mobile station losing synchronization with its assigned forward digital traffic channel. Also, the DC-power will tend to be filtered by the AC capacitors in the signal path, resulting in an inability to measure this power and in the generation of an erroneous RSSI estimate. An erroneous RSSI estimate, if reported to the base station, can result in the handoff of the mobile station to a less than optimum base station.

It is thus an object of this invention to provide a method for accurately measuring the signal strength of an RF channel.

It is a further object of this invention to provide a mobile telephone that operates to obtain an accurate RSSI estimation on an RF channel other than an assigned RF channel.

SUMMARY OF THE INVENTION

The foregoing and other problems are overcome and the objects of the invention are realized by a method, and by apparatus for accomplishing the method, that causes the power of a narrow bandwidth signal to be spread to a wider bandwidth by modulating the power of the spectral components that are located close to the carrier frequency. This reduces the DC component of a base band signal and correspondingly reduces the charging of the AC coupling capacitors in the base band circuitry. As a result, receiver recovery time is made more rapid, and a more accurate RSSI estimate is made by the mobile telephone.

A method for use in a mobile telephone for executing a Mobile Assisted Handoff Function includes the following steps: (a) receiving a command from a base station to measure a designated RF channel; (b) detecting an occurrence of an idle time slot on a currently assigned traffic channel; and (c) down converting an output frequency from an IF stage to a base band signal while adjusting a local oscillator signal of the IF stage to a frequency that is offset away from a local oscillator frequency that is used when receiving a signal from the designated RF channel. The step of adjusting includes the steps of introducing a predetermined frequency offset into the local oscillator signal of the IF stage, maintaining the predetermined frequency offset for a predetermined period of time, and removing the predetermined frequency offset. The method further includes a step of (d) sampling the base band signal to determine at least one characteristic of the base band signal.

The predetermined frequency offset may be less than a frequency spacing between adjacent RF channels. For example, if the channel spacing is 30 kHz, then a suitable value for the frequency offset is less than approximately 10 kHz. If the frequency offset is removed prior to sampling, the offset may be greater than the channel spacing, or greater than approximately 30 kHz. Furthermore, a time varying frequency offset may be applied instead of a stepped frequency offset.

The method includes a furthers step of reporting a result of the step of sampling to the base station over an RF channel other than the designated RF channel.

BRIEF DESCRIPTION OF THE DRAWING

The above described aspects of this invention are made more apparent and are more fully described in the following Detailed Description of the Invention, which is intended to be read in conjunction with the Figures of the attached Drawing, wherein.

DETAILED DESCRIPTION OF THE INVENTION

Figure 1:
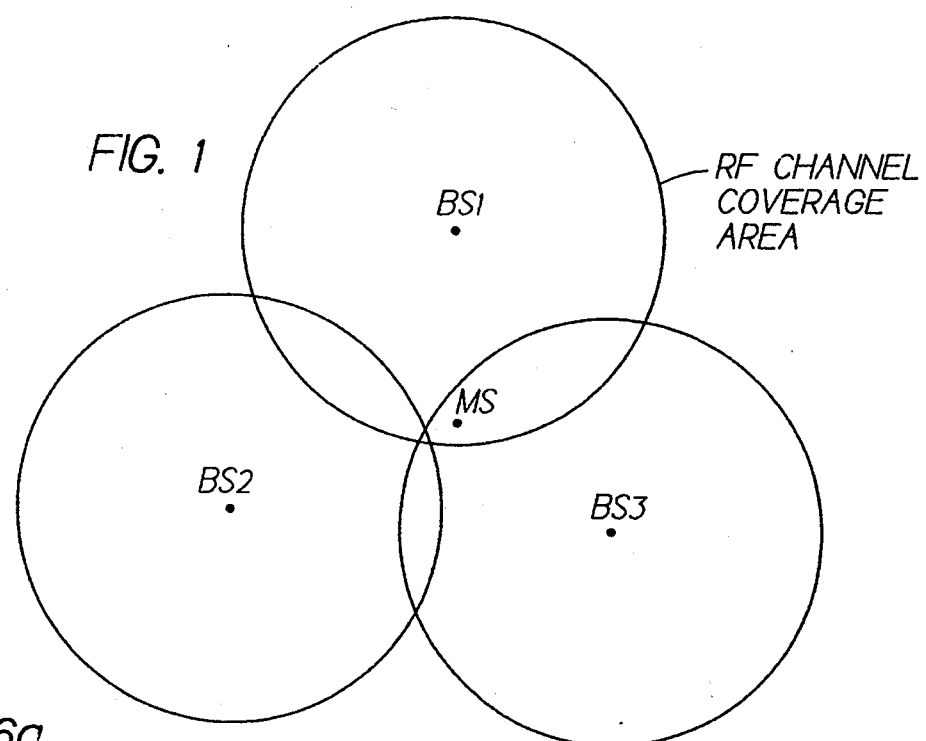
FIG. 1 is diagram of a portion of a cellular telephone network region showing a plurality of base stations having overlapping coverage areas.
Figure 2:
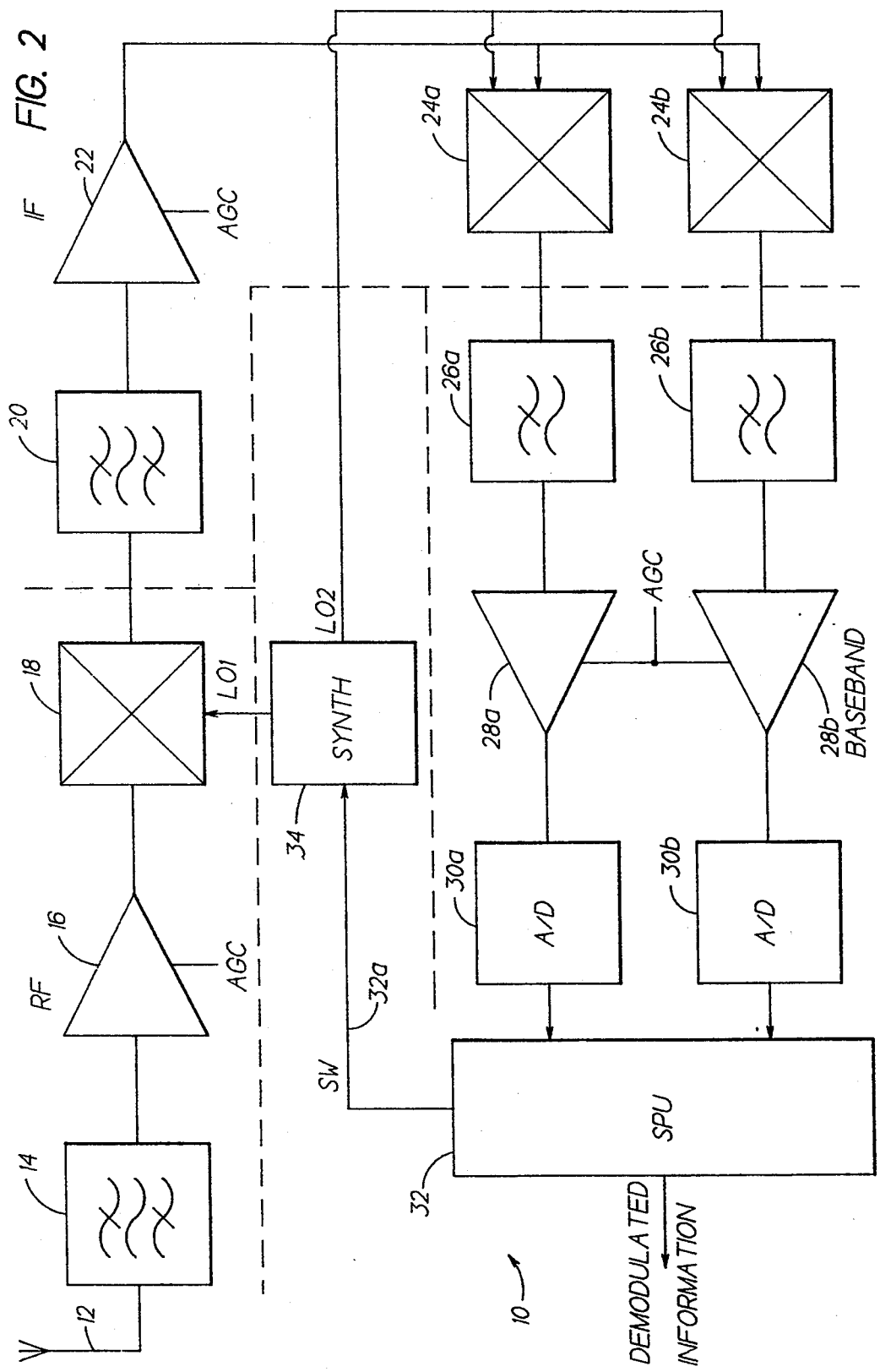
FIG. 2 is a block diagram of a radio receiver that is suitable for practicing the invention.

Reference is made to FIG. 2 which shows an AC coupled receiver 10 that is suitable for practicing this invention. An antenna 12 receives an RF transmission from a transmitter, typically one of the base stations of FIG. 1. The received signal is filtered at block 14 and amplified at block 16. Amplifier 16 receives an Automatic Gain Control (AGC) signal to maintain a predetermined signal magnitude at the output of the amplifier 16. The amplified RF signal is applied to a mixer 18 where it is mixed with a first local oscillator frequency (LO1). A difference frequency that is output by the mixer 18 is filtered at block 20 and amplified by an AGC controlled Intermediate Frequency (IF) amplifier 22. The output of amplifier 22 feeds mixers 24a and 24b.

In a mobile telephone embodiment that corresponds to the digital specification (IS-54-B) the signal received at antenna 12 is digitally modulated in accordance with a π/4-shift quadrature phase shift keying (DQPSK) technique. As such, a 90 degree phase shifter (not shown) is provided between the inputs to the mixers 24a and 24b.

A second input to the mixers 24a and 24b is a second local oscillator frequency (LO2) which is used to down convert the IF signal to base band. The difference components output from mixers 24a and 24b are further operated on in a known fashion by filters 26a and 26b, AGC controlled amplifiers 28a and 28b, and analog-to-digital (A/D) converters 30a and 30b. The digital outputs from converters 30a and 30b are received and demodulated by a signal processing unit (SPU) 32 to extract the intelligence that was DQPSK modulated onto the received RF carrier. The extracted intelligence may be speech, commands, or messages. One command that is received and extracted by the SPU 32 is a command to perform the MAHO function. A list of RF channels for which the mobile unit is to obtain the signal strength measurements is also received and stored by the SPU 32.

As stated above, in a presently preferred embodiment of the invention the receiver 10 is a component of a mobile telephone, in particular, a mobile telephone that operates in accordance with the dual mode IS-54-B specification. As such, a separate transmitter circuit (not shown) has an output coupled to the antenna 12.

LO1 has a frequency value that is programmably generated by a frequency synthesizer (SYNTH) 34. In operation, the SPU 32 extracts a forward digital traffic channel assignment message from the received digital data stream and programs, via signal lines 32a, the SYNTH 34 to the appropriate LO1 frequency. When correctly programmed, LO1, in conjunction with mixer 18, provides a constant IF frequency which, in combination with LO2 and mixers 24a and 24b, is converted to base band. For the purposes of this invention the SYNTH 34 may be considered to be a voltage controlled oscillator (VCO) having a controlling voltage input that is provided by a digital to analog (D/A) converter. As such, a Synthesizer Write (SW) signal that is conveyed by signal lines 32a is a digital code that is input to the internal D/A converter so as to obtain a predetermined voltage output, the voltage output driving the internal VCO to the desired LO1 frequency. In accordance with this invention, during the MAHO measurement function the frequency components that are located near to the DC-frequency are spread to have a wider band width. This is preferably accomplished by varying or modulating LO1. However, the modulation of LO2 can also be accomplished to achieve the same beneficial result.

It is noted that a fixed frequency shift of LO1 or LO2 is unable to completely overcome the problem of the DC offsets that accumulate in the AC-coupled receiver 10. Also, if the frequency error of LO1 or LO2 is too large, a portion of the received digitally modulated signal power will be lost into a neighboring frequency band.

The SPU 32 thus controls the modulation of LO1 during the execution of the MAHO function, and operates in accordance with a specific timing protocol that is described below.

Figure 3:
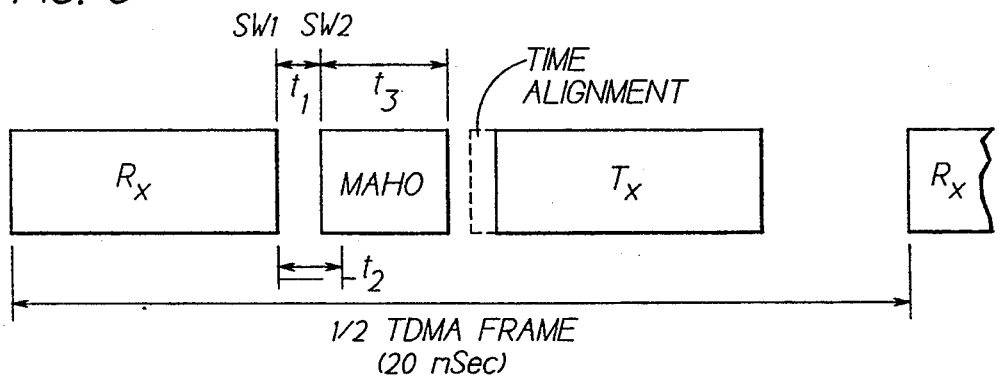
FIG. 3 is a timing diagram that illustrates a portion of a TDMA frame within which a MAHO measurement is taken.

Referring to FIG. 3 there are shown receive (Rx) and transmit (Tx) time slots that occur within one half of a TDMA frame (20 milliseconds). The mobile telephone is assigned a particular one or ones of the time slots prior to beginning operation on the assigned forward (digital) traffic channel. The MAHO signal strength sample for another channel is taken during an idle (non-assigned) time slot between the Rx and Tx time slots. In operation, the SPU 32 operates to re-program the SYNTH 34 to another RF channel (referred to herein as the MAHO channel) at the end of the Rx, the MAHO channel being a channel that is included within the list of RF channels that is received from the base station in a Measurement Order Message (IS-54-B, paragraph 3.7.3.1.3.2.2). It is assumed for the following discussion that the SYNTH 34 generates a frequency step which has a minimum value that is equal to B, the channel spacing, or 30 kHz. It should be realized however that the VCO of SYNTH 34 can be varied to produce a frequency step that is larger than the channel spacing. Furthermore, the VCO can be varied so as to modulate LO1 with a continuous wave (CW) signal instead of with a frequency step. A suitable frequency is one that is less than approximately 10 kHz.

It is particularly noted that the SYNTH 34 is not initially programmed to generate the LO1 frequency so as to exactly correspond to the correct LO1 value for the MAHO channel. Instead, the SYNTH 34 is initially programmed with a value, SW1, in accordance with the following formula:

$$SW1 = F(\text{maho}) \pm N*B,$$

where $N=(1,\infty)$, F(maho)=the correct absolute MAHO frequency, SW1=the LO1 SYNTH 34 write value, and B is the channel spacing.

Still referring to FIG. 3, and after the time t1 has expired, LO1 has settled to a frequency that is $\pm N*B$ Hertz away from the absolute, F(maho), MAHO channel frequency. At the end of t1 the correct value that corresponds to the required LO1 for the F(maho) is written as (SW2) to the SYNTH 34. That is, $$SW2 = F(\text{maho}).$$

The time period t2 has a duration selected to provide settling time after the SW2 value is written to the SYNTH 34 and before beginning the A/D conversion of the MAHO samples.

If SW2 is not written to the SYNTH 34, then the frequency offset commanded by SW1 is preferably less than the channel spacing, for example, less than approximately 10 kHz. If SW2 is written, then the frequency offset commanded by SW1 can be larger than the channel spacing, for example, approximately 60 kHz.

When reading the MAHO samples, the frequency of LO1 has some offset compared to the absolute F(maho)-frequency, but LO1 is settling towards the correct frequency value. Preferably, the frequency offset is not large compared to the band width, or 30 kHz as specified by IS-54-B, in order to avoiding measuring the power from a neighboring channel and to avoid losing signal power in the frequency selective components of the receiver 10. However, as was mentioned above, the frequency offset may be greater than the channel spacing, or may be a time-varying frequency offset.

Figure 5:
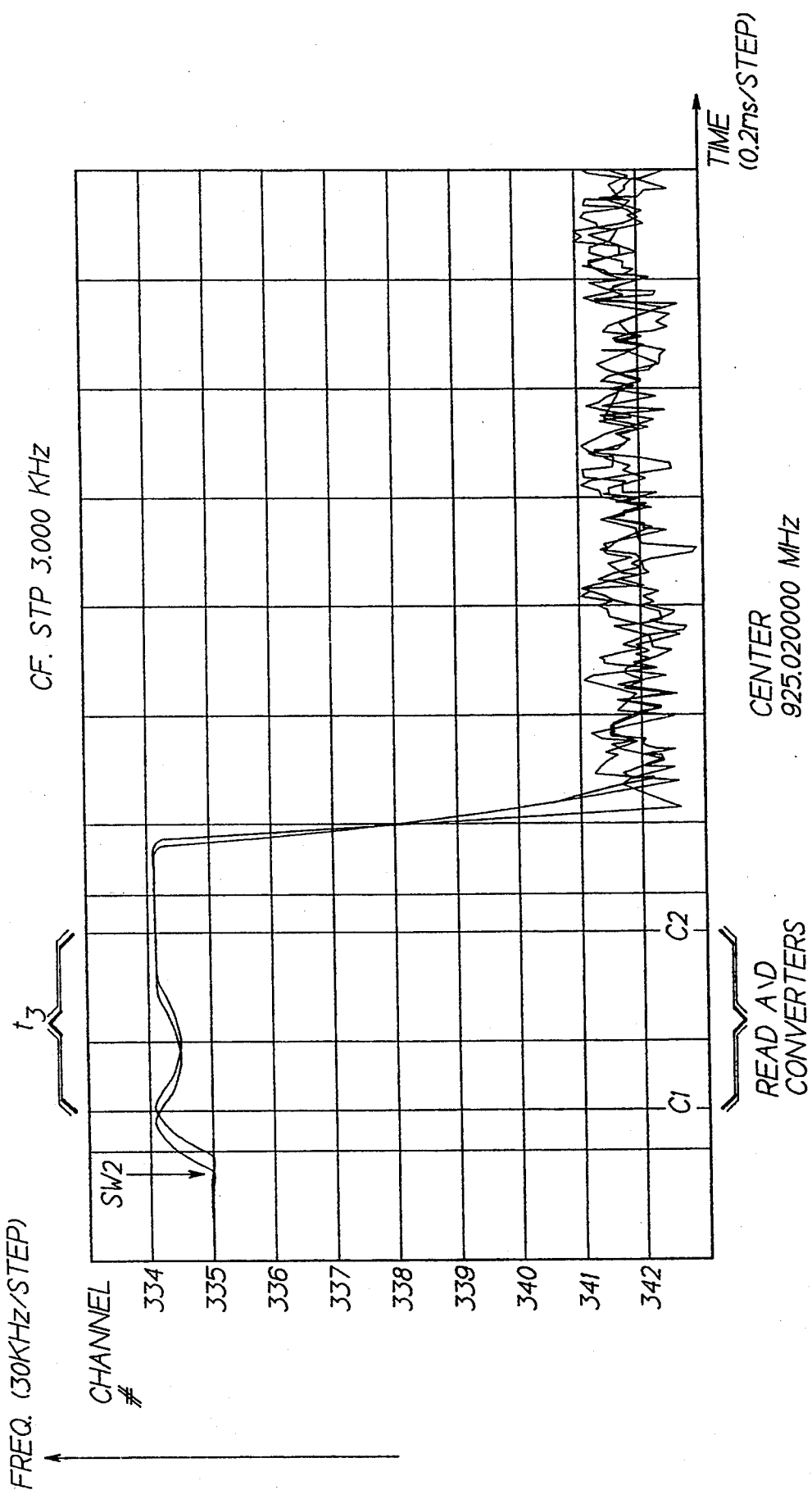
FIG. 5 illustrates a waveform that is obtained in accordance with the invention, and further illustrates an interval of time within which a MAHO measurement is made.

FIG. 5 shows the frequency offset of LO1 as a function of time. The channel before taking the MAHO-samples is 335 and the absolute F(maho) is 334. MAHO-samples are taken between cursor times C1 and C2, which correspond to time t3 in FIG. 3. The SYNTH 34 is then subsequently programmed to the frequency of the forward digital traffic channel. The IS-54-B Interim Specification requires that the RSSI be accumulated over 25 frames and then averaged.

Figure 6A:
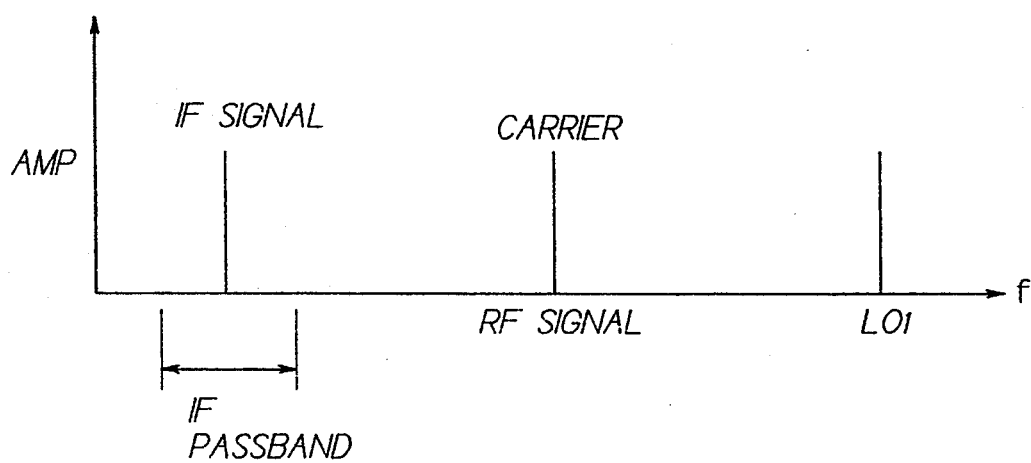
FIG. 6a is an amplitude/frequency graph that illustrates the operation of the circuit of FIG. 2 without the use of the teaching of this invention.
Figure 6B:
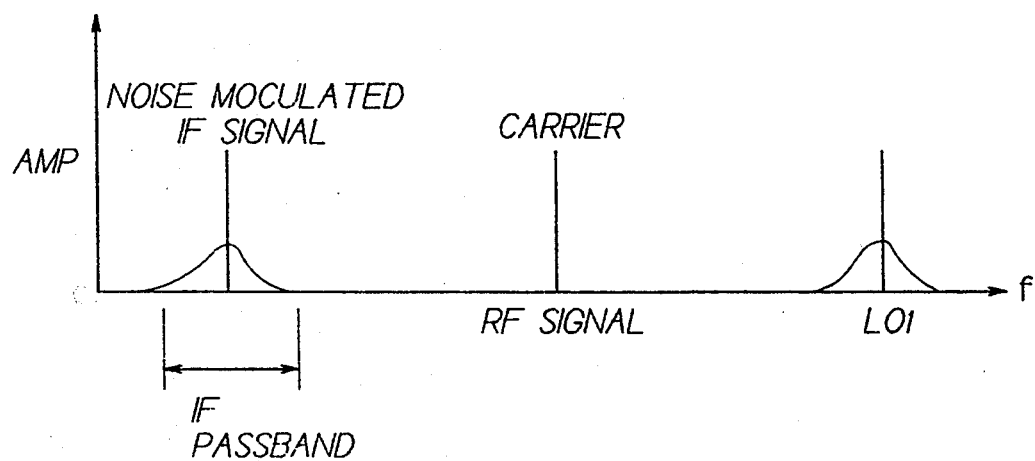
FIG. 6b is an amplitude/frequency graph that illustrates the operation of the circuit of FIG. 2 in accordance with the teaching of this invention.

It can be seen that timing parameters t1, t2 and t3, in combination with the properties of SYNTH 34 and the method performed by the SPU 32, introduces a phase noise with known statistics into LO1. That is, by modulating LO1, the IF frequency output by mixer 18 is also modulated. In that the IF components are operated off of their nominal design frequency, the undesirable DC component is not built up in the base band circuitry. As is seen by contrasting the conventional case of FIG. 6a with FIG. 6b, the low frequency components located around the IF frequency are spread to a wider band width. As a result, the charging of the capacitors in the base band circuitry with the large DC component is significantly reduced, thereby overcoming the problems discussed previously.

Figure 7:
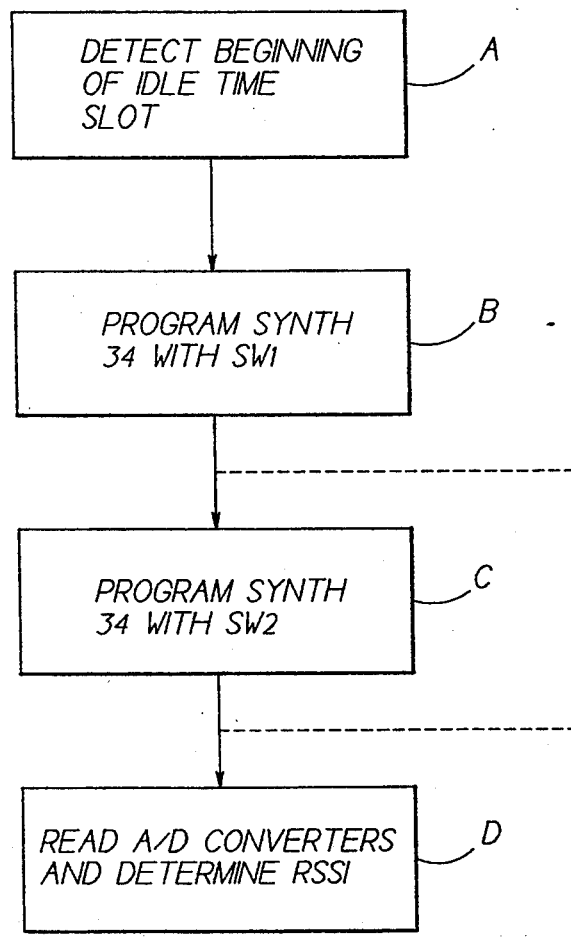
FIG. 7 is a flow chart the illustrates a method of this invention.
Figure 4:
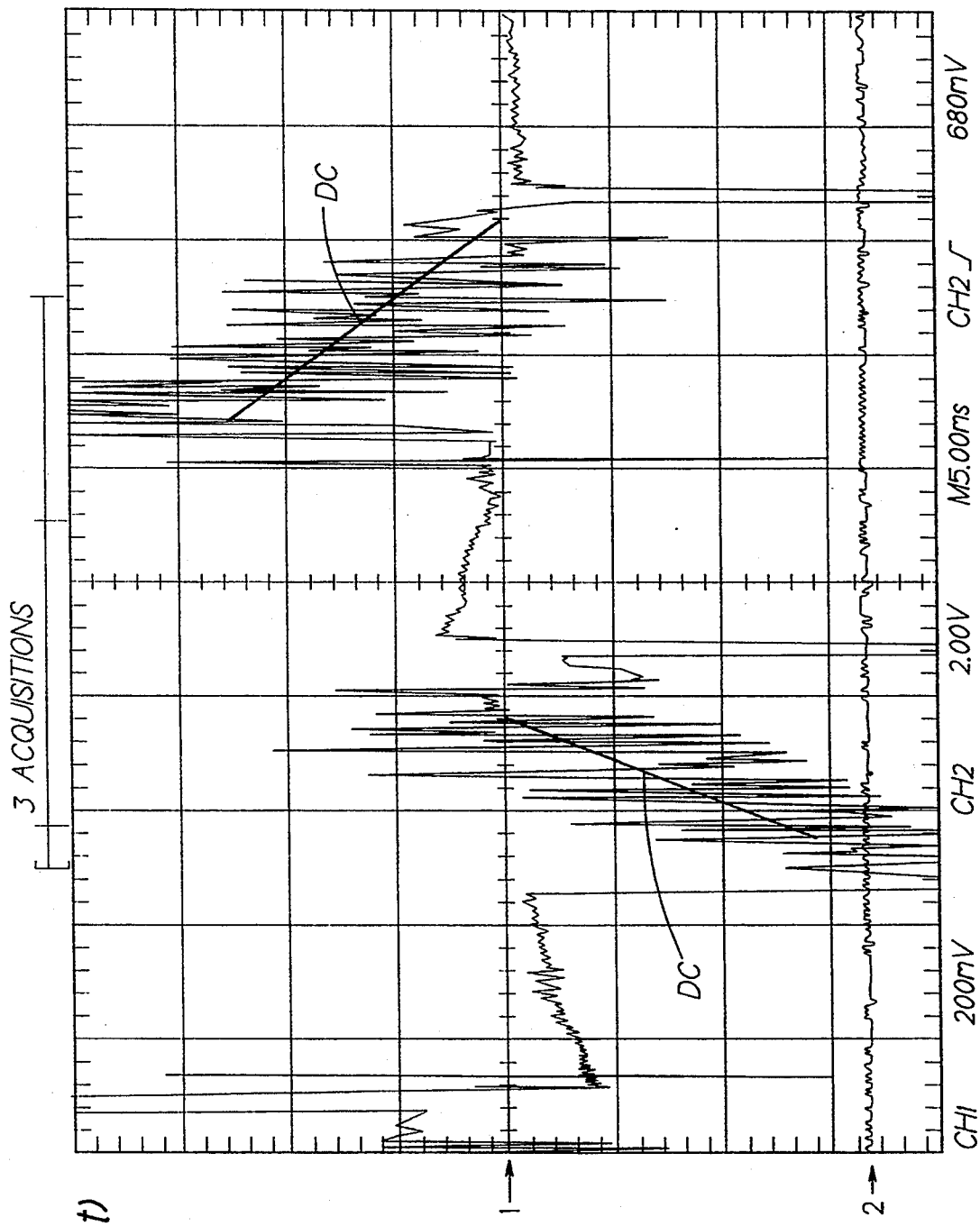
FIG. 4 illustrates waveforms obtained in response to a change in synthesizer frequency without the benefit of the teaching of the invention.

FIG. 7 is a flow chart that illustrates a method in accordance with the invention.

At Block A the SPU 32 detects the beginning of an idle slot on the forward traffic channel. This can be detected through the use of a timer that is synchronized to an occurrence of a valid, assigned time slot, or by detecting a unique synchronization word that is transmitted at the beginning of every slot.

At Block B the SPU 32 programs the SYNTH 34 to generate a first local oscillator frequency that is offset away from an optimal frequency for the MAHO channel.

At Block C the SPU 32 optionally programs the SYNTH 34 to generate a second local oscillator frequency that corresponds to the optimal frequency for the MAHO channel.

At Block D the SPU 32 reads the A/D converters to determine the RSSI for the MAHO channel.

In view of the foregoing description of a presently preferred embodiment of the invention, it should be realized that various modifications of this preferred embodiment may be made, and that these modifications are within the scope of the teaching of the invention. By example, the teaching of the invention is not limited for use with only a $\pi/4$-shift DQPSK modulated signal, and can be used with other types of modulations and also with very narrow band, un-modulated carrier signals. Also, and as was previously noted, LO2 can be varied to achieve the desired result. Furthermore, only the fixed frequency offset provided by SW1 can be employed, without also reprogramming the SYNTH 34 with SW2 to provide the correct MAHO IF frequency.

Furthermore, if the correct MAHO frequency (SW2) is written to SYNTH 34 before starting a sampling process, then the original frequency offset can be more than 30 kHz. By example, the original frequency offset can be approximately 60 kHz. Also, a time varying frequency offset can be employed. A suitable frequency for modulating L01 is less than approximately 10 kHz.

Thus, these and other modifications of the preferred embodiment of the invention may occur to those having skill in the art. This invention is therefore not intended to be limited to only the preferred embodiment described above, but is instead intended to be given a scope commensurate with the scope of the claims that follow.

What is claimed is:

1. A method for use in a mobile telephone for making a received signal strength measurement of a predetermined phase modulated RF channel, comprising the steps of:

detecting an occurrence of a beginning of a signal strength measurement period;

tuning the mobile telephone from a first frequency corresponding to a first phase modulated RF channel to a second frequency that is offset away from a second frequency that corresponds to the predetermined phase modulated RF channel;.

receiving a signal from the predetermined phase modulated RF channel;

down converting the received phase modulated signal to a base band signal while modulating low frequency components of the base band signal; and sampling the base band signal to obtain a received signal strength measurement of the predetermined RF channel.

2. A method as set forth in claim 1 wherein the step of tuning includes a step of introducing a frequency offset into a local oscillator signal.

3. A method as set forth in claim 1 wherein the step of tuning includes a step of:

introducing a frequency offset into a local oscillator signal of an IF stage; and wherein the step of modulating includes the steps of:

maintaining the frequency offset for a predetermined period of time; and removing the frequency offset prior to executing the step of sampling.

4. A method for use in a mobile telephone for obtaining a received signal strength measurement of a predetermined RF channel, comprising the steps of:

receiving a command from a base station over a first RF channel, the command causing the mobile telephone to measure a signal strength of a second RF channel other than the first RF channel;

detecting an occurrence of a beginning of a signal strength measurement period;

adjusting a local oscillator signal of an IF stage to a frequency that is offset away from a local oscillator frequency that is normally used when receiving a signal from the second RF channel;

down converting an output frequency from the IF stage to a base band signal; and sampling the base band signal to determine at least an indication of the signal strength of the second RF channel.

5. A method as set forth in claim 4 wherein the step of detecting includes a step of detecting an occurrence of an idle time slot on a currently assigned forward traffic channel.

6. A method as set forth in claim 4 wherein the step of adjusting includes the steps of:

introducing a predetermined frequency offset into the local oscillator signal of the IF stage such that the frequency of the local oscillator signal is offset away from the local oscillator frequency that is normally used when receiving a signal from the second RF channel;

maintaining the predetermined frequency offset for a predetermined period of time; and removing the predetermined frequency offset prior to executing the step of sampling.

7. A method as set forth in claim 6 wherein the predetermined frequency offset is greater than a frequency spacing between adjacent RF channels.

8. A method as set forth in claim 4 wherein the step of adjusting includes the steps of: introducing a predetermined frequency offset into the local oscillator signal of the IF stage such that the frequency of the local oscillator signal is offset away from the local oscillator frequency that is normally used when receiving a signal from the second RF channel; and maintaining the predetermined frequency offset during the step of sampling.

9. A method as set forth in claim 8 wherein the predetermined frequency offset is less than a frequency spacing between adjacent RF channels.

10. A method as set forth in claim 9 wherein the predetermined frequency offset is less than approximately 10 kHz.

11. A method as set forth in claim 4 wherein the step of adjusting includes a step impressing a time varying frequency offset onto the local oscillator signal of the IF stage such that the frequency of the local oscillator signal is offset in a time varying manner away from the local oscillator frequency that is normally used when receiving a signal from the second RF channel.

12. A method as set forth in claim 11 wherein the time varying frequency offset has a frequency of less than approximately 10 kHz.

13. A method as set forth in claim 4 and further comprising a step of reporting a result of the step of sampling to the base station over an RF channel other than the second RF channel.

14. A method for use in a mobile telephone for executing a Mobile Assisted Handoff Function, comprising the steps of:

receiving a command over a first RF channel, the command causing the mobile telephone to measure a characteristic of a designated RF channel other than the first RF channel;

detecting an occurrence of an idle time slot on a currently assigned traffic channel;

adjusting a local oscillator signal of an IF stage to a frequency that is offset away from a local oscillator frequency that is normally used when receiving a signal from the designated RF channel, the step of adjusting including a step of introducing a predetermined frequency offset into the local oscillator signal of the IF stage, maintaining the predetermined frequency offset for a predetermined period of time, and removing the predetermined frequency offset;

down converting an output frequency from the IF stage to a base band signal; and sampling the base band signal to determine at least an indication of the signal strength of the designated RF channel.

15. A method as set forth in claim 14 wherein a value of the predetermined frequency offset is a function of a frequency spacing between adjacent RF channels.

16. A method as set forth in claim 14 wherein the predetermined frequency offset is greater than approximately 30 kHz.

17. A method as set forth in claim 14 and further comprising a step of reporting a result of the step of sampling over an RF channel other than the designated RF channel.

18. A method for use in a mobile telephone for executing a Mobile Assisted Handoff Function, comprising the steps of:

receiving a command over a first RF channel, the command causing the mobile telephone to measure a characteristic of a designated RF channel other than the first RF channel;

detecting an occurrence of an idle time slot on a currently assigned traffic channel;

adjusting a local oscillator signal of an IF stage to a frequency that is offset away from a local oscillator frequency that is normally used when receiving a signal from the designated RF channel, the step of adjusting including a step of introducing a predetermined frequency offset into the local oscillator signal of the IF stage;

down converting an output frequency from the IF stage to a base band signal; and sampling the base band signal to determine at least an indication of the signal strength of the designated RF channel.

19. A method as set forth in claim 18 wherein a value of the predetermined frequency offset is a function of a frequency spacing between adjacent RF channels.

20. A method as set forth in claim 18 wherein the predetermined frequency offset is less than approximately 30 kHz.

21. A method as set forth in claim 18 and further comprising a step of reporting a result of the step of sampling over an RF channel other than the designated RF channel.

22. A mobile telephone including a receiver and further comprising:

means for receiving, during a currently assigned receive time slot transmitted over a first RF channel, a command to measure a characteristic of at least one other RF channel;

means for detecting an occurrence of an idle time slot on the first RF channel;

means, responsive to the received command and to the detection of an occurrence of an idle time slot, for adjusting a local oscillator signal of an IF stage of the receiver to a frequency that differs from a local oscillator frequency that is normally used when receiving a signal from the at least one other RF channel;

means for down converting an output frequency from the IF stage to a base band signal; and means for sampling the base band signal to determine at least an indication of a signal strength of the at least one other RF channel.

23. A mobile telephone as set forth in claim 22 wherein said adjusting means includes:

means for programming a variable frequency generating means to introduce a predetermined frequency offset into the local oscillator signal of the IF stage, said programming means including means for maintaining the predetermined frequency offset for a predetermined period of time, and means for removing the predetermined frequency offset prior to the operation of said sampling means.

24. A mobile telephone as set forth in claim 23 wherein the predetermined frequency offset is greater than a frequency spacing between adjacent RF channels.

25. A mobile telephone as set forth in claim 22 wherein said adjusting means includes:

means for programming a variable frequency generating means to introduce a predetermined frequency offset into the local oscillator signal of the IF stage.

26. A mobile telephone as set forth in claim 25 wherein the predetermined frequency offset is less than a frequency spacing between adjacent RF channels.

27. A mobile telephone as set forth in claim 22 wherein said adjusting means includes:

means for programming a variable frequency generating means to impress a time varying frequency offset onto the local oscillator signal of the IF stage.

28. A mobile telephone as set forth in claim 27 wherein the time varying frequency offset varies at a frequency that is less than a frequency spacing between adjacent RF channels.

29. A mobile telephone as set forth in claim 22 and further comprising means for transmitting during a transmit time slot at least the determined signal strength indication.

30. A transceiver including a receiver and a transmitter, the transceiver being capable of operating within a cellular communication system and further comprising:

means for receiving, during at least one time slot transmitted over a first RF channel, a command to measure a characteristic of at least one other RF channel;

means for detecting an occurrence of an idle time slot on the first RF channel;

means, responsive to the received command and to the detection of an occurrence of an idle time slot, for adjusting an oscillator frequency of the receiver to a frequency that differs from a frequency that is normally used when receiving a signal from the at least one other RF channel;

means for converting an output of the receiver to a base band signal;

means for determining from the base band signal at least an indication of a signal strength of the at least one other RF channel; and means for transmitting during a transmit time slot at least the determined signal strength indication.

* * * * *

UNITED STATES PATENT AND TRADEMARK OFFICE
CERTIFICATE OF CORRECTION

PATENT NO. : 5,410,733
DATED : April 25, 1995
INVENTOR(S) : Niva et al.

It is certified that error appears in the above-indentified patent and that said Letters Patent is hereby corrected as shown below:

At column 6, line 65, through column 7, line 15, claim 1 should read as follows:

1. A method for use in a mobile telephone for making a received signal strength measurement of a predetermined phase modulated RF channel, comprising the steps of:

detecting an occurrence of a beginning of a signal strength measurement period;

tuning the mobile telephone from a first frequency corresponding to a first phase modulated RF channel to a second frequency that is offset away from a second frequency that corresponds to the predetermined phase modulated RF channel;

receiving a signal from the predetermined phase modulated RF channel, the step of receiving including a step of converting a received phase modulated RF signal to an intermediate frequency (IF) phase modulated signal;

down converting the IF phase modulated signal to a base band signal, wherein at least one of the steps of receiving and down converting includes a step of modulating low frequency components of the base band signal; and sampling the base band signal to obtain a received signal strength measurement of the predetermined RF channel.

UNITED STATES PATENT AND TRADEMARK OFFICE
CERTIFICATE OF CORRECTION

PATENT NO. : 5,410,733
DATED : April 25, 1995
INVENTOR(S) : Niva et al.

It is certified that error appears in the above-indentified patent and that said Letters Patent is hereby corrected as shown below:

At column 7, line 28, through line 45, claim 4 should read as follows:

4. A method for use in a mobile telephone for obtaining a received signal strength measurement of a predetermined RF channel, comprising the steps of:

receiving a command from a base station over a first RF channel, the command causing the mobile telephone to measure a signal strength of a second RF channel other than the first RF channel;

detecting an occurrence of a beginning of a signal strength measurement period;

adjusting a local oscillator signal of an IF stage to a frequency that is offset away from a local oscillator frequency that is normally used when receiving a signal from the second RF channel, the local oscillator signal being used to convert a received RF signal to a lower frequency signal that is an output frequency of the IF stage;

down converting the output frequency from the IF stage to a base band signal; and sampling the base band signal to determine, at least an indication of the signal strength of the second RF channel.

UNITED STATES PATENT AND TRADEMARK OFFICE
CERTIFICATE OF CORRECTION

PATENT NO. : 5,410,733
DATED : April 25, 1995
INVENTOR(S) : Niva et al.

It is certified that error appears in the above-indentified patent and that said Letters Patent is hereby corrected as shown below:

At column 8, line 26, through line 49, claim 14 should read as follows:

14. A method for use in a mobile telephone for executing a Mobile Assisted Handoff Function, comprising the steps of:

receiving a command over a first RF channel, the command causing the mobile telephone to measure a characteristic of a designated RF channel other than the first RF channel;

detecting an occurrence of an idle time slot on a currently assigned traffic channel;

adjusting a local oscillator signal of an IF stage to a frequency that is offset away from a local oscillator frequency that is normally used when receiving a signal from the designated RF channel, the local oscillator signal being used to convert a received RF signal to a lower frequency signal that is an output frequency of the IF stage, the step of adjusting including a step of introducing a predetermined frequency offset into the local oscillator signal of the IF stage, maintaining the predetermined frequency offset for a predetermined period of time, and removing the predetermined frequency offset;

down converting the output frequency from the IF stage to a base band signal; and sampling the base band signal to determine at least an indication of the signal strength of the designated RF channel.

UNITED STATES PATENT AND TRADEMARK OFFICE
CERTIFICATE OF CORRECTION

PATENT NO. : 5,410,733
DATED : April 25, 1995
INVENTOR(S) : Niva et al.

It is certified that error appears in the above-indentified patent and that said Letters Patent is hereby corrected as shown below:

At column 8, line 60, through column 9, line 13, claim 18 should read as follows:

18. A method for use in a mobile telephone for executing a Mobile Assisted Handoff Function, comprising the steps of:

receiving a command over a first RF channel, the command causing the mobile telephone to measure a characteristic of a designated RF channel other than the first RF channel;

detecting an occurrence of an idle time slot on a currently assigned traffic channel;

adjusting a local oscillator signal of an IF stage to a frequency that is offset away from a local oscillator frequency that is normally used when receiving a signal from the designated RF channel, the local oscillator signal being used to convert a received RF signal to a lower frequency signal that is an output frequency of the IF stage, the step of adjusting including a step of introducing a predetermined frequency offset into the local oscillator signal of the IF stage;

down converting the output frequency from the IF stage to a base band signal; and sampling the base band signal to determine at least an indication of the signal strength of the designated RF channel.

UNITED STATES PATENT AND TRADEMARK OFFICE
CERTIFICATE OF CORRECTION

PATENT NO. : 5,410,733
DATED : April 25, 1995
INVENTOR(S) : Niva et al

It is certified that error appears in the above-indentified patent and that said Letters Patent is hereby corrected as shown below:

At column 9, line 24, through line 44, claim 22 should read as follows:

22. A mobile telephone including a receiver and further comprising:

means for receiving, during a currently assigned receive time slot transmitted over a first RF channel, a command to measure a characteristic of at least one other RF channel;

means for detecting an occurrence of an idle time slot on the first RF channel;

means, responsive to the received command and to the detection of an occurrence of an idle time slot, for adjusting a local oscillator signal of an IF stage of the receiver to a frequency that differs from a local oscillator frequency that is normally used when receiving a signal from the at least one other RF channel, the local oscillator signal being used to convert a received RF signal to a lower frequency signal that is an output frequency of the IF stage;

means for down converting the output frequency from the IF stage to a base band signal; and means for sampling the base band signal to determine at least an indication of a signal strength of the at least one other RF channel.

UNITED STATES PATENT AND TRADEMARK OFFICE
CERTIFICATE OF CORRECTION

PATENT NO. : 5,410,733
DATED : April 25, 1995
INVENTOR(S) : Niva et al

It is certified that error appears in the above-indentified patent and that said Letters Patent is hereby corrected as shown below:

At column 10, line 30, through line 51, claim 30 should read as follows:

30. A transceiver including a receiver and a transmitter, the transceiver being capable of operating within a cellular communication system and further comprising:

means for receiving, during at least one time slot transmitted over a first RF channel, a command to measure a characteristic of at least one other RF channel;

means for detecting an occurrence of an idle time slot on the first RF channel;

means, responsive to the received command and to the detection of an occurrence of an idle time slot, for adjusting an oscillator frequency of the receiver to a frequency that differs from a frequency that is normally used when receiving a signal from the at least one other RF channel, the oscillator signal being used to convert a received RF signal to a lower frequency signal;

UNITED STATES PATENT AND TRADEMARK OFFICE
CERTIFICATE OF CORRECTION

PATENT NO. : 5,410,733
DATED : April 25, 1995
INVENTOR(S) : Niva et al

It is certified that error appears in the above-indentified patent and that said Letters Patent is hereby corrected as shown below:

means for converting the lower frequency signal to a base band signal;

means for determining from the base band signal at least an indication of a signal strength of the at least one other RF channel; and means for transmitting during a transmit time slot at least the determined signal strength indication.

Signed and Sealed this

Eighth Day of August, 1995

Attest:

Attesting Officer

BRUCE LEHMAN

Commissioner of Patents and Trademarks